UNITED STATES PATENT OFFICE.

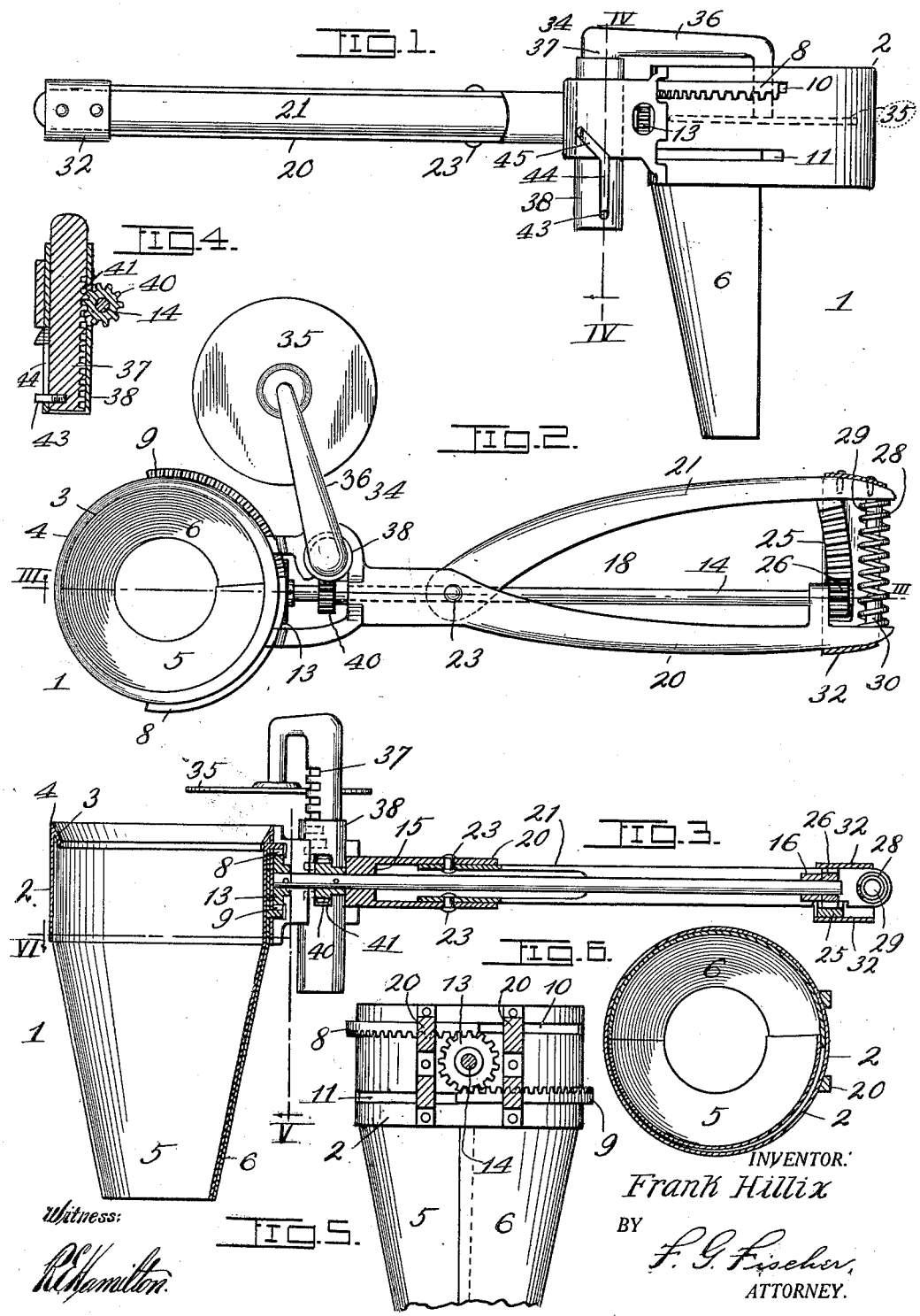

FRANK HILLIX, OF WESTON, MISSOURI.

ICE-CREAM-CONE FILLER.

1,232,309.    Specification of Letters Patent.    Patented July 3, 1917.

Application filed March 10, 1917. Serial No. 153,861.

*To all whom it may concern:*

Be it known that I, FRANK HILLIX, a citizen of the United States, residing at Weston, in the county of Platte and State of Missouri, have invented certain new and useful Improvements in Ice-Cream-Cone Fillers, of which the following is a specification.

My invention relates to ice cream cone fillers, and one object is the provision of a simple and reliable device whereby ice cream may be dipped from a freezer or other receptacle, and molded into proper form to fit within an ice cream cone.

A further object of the invention is the provision of means for forcing the molded ice cream from the device into an ice cream cone.

Other objects will hereinafter appear, and in order that the invention may be fully understood, reference will now be made to the accompanying drawings, in which:

Figure 1 is a side elevation of the device in position after the molded ice cream has been forced therefrom.

Fig. 2 is a plan view of the device ready to be filled with ice cream.

Fig. 3 is a longitudinal section on line III—III of Fig. 2.

Fig. 4 is a broken detail vertical section on line IV—IV of Fig. 1.

Fig. 5 is a broken vertical section on line V of Fig. 3.

Fig. 6 is a horizontal section on line VI of Fig. 3.

In carrying out the invention, I employ an open-ended cup 1, consisting of a body having a cylindrical upper portion and a tapered lower portion of conical frustum shape. Said cup 1 embodies an upper fixed cylinder 2 having an inwardly and downwardly turned marginal flange 3, the upper edge of which is reduced to a sharp cutting edge 4, so that the device may be readily drawn through ice cream in a freezer, when filling the cup. Said cup 1 also embodies a pair of rotatable members 5 and 6, the upper portions of which are, substantially, semi-cylindrical to fit within the cylinder 2, while their lower portions taper downwardly.

The front edges of the members 5 and 6, when in closed position, abut squarely against each other, while their rear edges lap as shown on Fig. 6, so that they may fold upon each other when opened to the position disclosed by Fig. 1, preparatory to discharging the ice cream therefrom. The upper edges of the members 5 and 6 fit beneath the flange 3, which is made slightly wider at its rear side as indicated by Fig. 2, to accommodate the rear overlapping edges of the members 5 and 6.

The members 5 and 6 are provided with fixed segmental racks 8 and 9, which project through slots 10 and 11 in the upper and lower portions, respectively, of the cylinder 2. Said racks 8 and 9 are spaced apart to admit an intermeshing pinion 13, fixed upon a shaft 14 journaled in bearings 15 and 16 in a handle 18. Said handle 18 is firmly fixed at its forward end to the rear side of the cylinder 2 and comprises a stationary member 20 and a longitudinal member 21 operatably-connected at its forward end to the stationary member by pivots 23. Members 20 and 21 are bowed to provide a convenient gripping surface, and the movable member 21 is provided with a fixed segmental rack 25, which intermeshes with and actuates a pinion 26, fixed upon the rear end of the shaft 14.

The rear ends of the handle members are normally held apart by a spring 28, the ends of which embrace and are held in place by studs 29 and 30 on the handle members 20 and 21, respectively. The expansive action of the spring 28 is limited by a guard 32, which extends clear around the rear ends of the handle members 20 and 21 and is fixed to the handle member 21 to move therewith. This guard 32, in addition to limiting the expansion of the spring 28 and the opening movement of the handle members, also protects the palm of the hand from coming into contact with said spring or the pinion 26.

34 designates a plunger for pushing the molded ice cream from the cup 1 into an ice cream cone. Said plunger embodies a disk 35 carried on a crank arm 36, fixed to the upper end of a vertical rack 37 slidably and rotatably mounted in a tubular guide 38, fixed to the forward portion of the handle member 20. A pinion 40 fixed upon the forward portion of the shaft 14, projects through an opening 41 in the guide 38 and intermeshes with the rack 37, the teeth of which are longer near its lower end, as indicated by dotted lines, Fig. 3, so that they will remain in mesh with the pinion 40 when the plunger 34 is swung to the position disclosed by Fig. 2. The plunger 34 is guided to the last-mentioned position by a pin 43, secured to the lower end of the rack 37 and projecting through a slot 44 in one side of the guide 38. The lower portion of the slot 44 is vertical to guide the disk 35 into the upper portion of the cup 1, while the upper portion of said slot 44 extends at an oblique angle as indicated at 45 to coact with the pin 43 in swinging the disk 35 to the position disclosed by Fig. 2.

Normally the device is in the position disclosed by Fig. 2, so that the disk 35 will not be in the way when dipping up ice cream from a container. After the cup 1 has been filled with ice cream, its lower conical end is inserted in the top of a cone. The handle member 21 is then pressed toward the fixed handle member 20, in order to rotate the pinion 26 through the intermediacy of the rack 25. As the pinion 26 rotates, it rotates the shaft 14 therewith, which in turn rotates the pinion 13, causing it to rotate the racks 8 and 9 in opposite directions and thus fold the cup members 5 and 6 upon each other, so that the ice cream may be forced from the cup. The rotation of the shaft 14 also rotates the pinion 40 which moves the rack 37 downwardly. As the rack moves downwardly the pin 43, sliding through the oblique portion 45 of the slot 44, rotates said rack 37 and causes it to swing the disk 35 into position to enter the cup 1, into which it is then guided by the pin 43 and the vertical portion of the slot 44. As the disk 35 moves downwardly in the upper portion of the cup, it forces the ice cream therefrom into the cone. After the ice cream has been discharged from the cup and the latter removed from the upper end of the cone, pressure on the handle member 21 is released whereupon the spring 28 forces said handle member 21 outwardly, causing it, through the intermediacy of the intervening gearing, to restore the movable parts to their normal positions.

From the foregoing description, it is apparent that I have produced a device which is well adapted for the purposes intended, and while I have shown and described the preferred form of my invention, I reserve the right to make such changes in the construction, combination, and arrangement of parts as properly fall within the spirit and scope of the claims.

Having thus described my invention, what I claim and desire to secure by Letters Patent, is:

1. In a device of the character described, a cup having two members adapted to open to allow discharge of the cup contents, segmental racks fixed to said members, a gear intermeshing with said racks to actuate the same to open and close the two cup members, a shaft upon which said gear is fixed, a pinion fixed to said shaft to rotate the same, a rack for actuating said pinion, and a handle to the cup provided with a movable member to which the last-mentioned rack is fixed.

2. In a device of the character described, a cup adapted to open to allow discharge of its contents, a disk for discharging said contents, a crank arm carrying said disk, a rack carrying said crank arm, a guide for said rack, gearing for moving the rack up and down, and a pin coacting with the slot in the guide whereby the rack is turned during a part of its up and down movement for the purpose of swinging the disk in proper relation to the cup, substantially as described.

In testimony whereof I affix my signature. in the presence of two witnesses.

FRANK HILLIX.

Witnesses:
F. G. FISCHER,
L. J. FISCHER.

Copies of this patent may be obtained for five cents each, by addressing the "Commissioner of Patents Washington, D. C."